Figure 1:
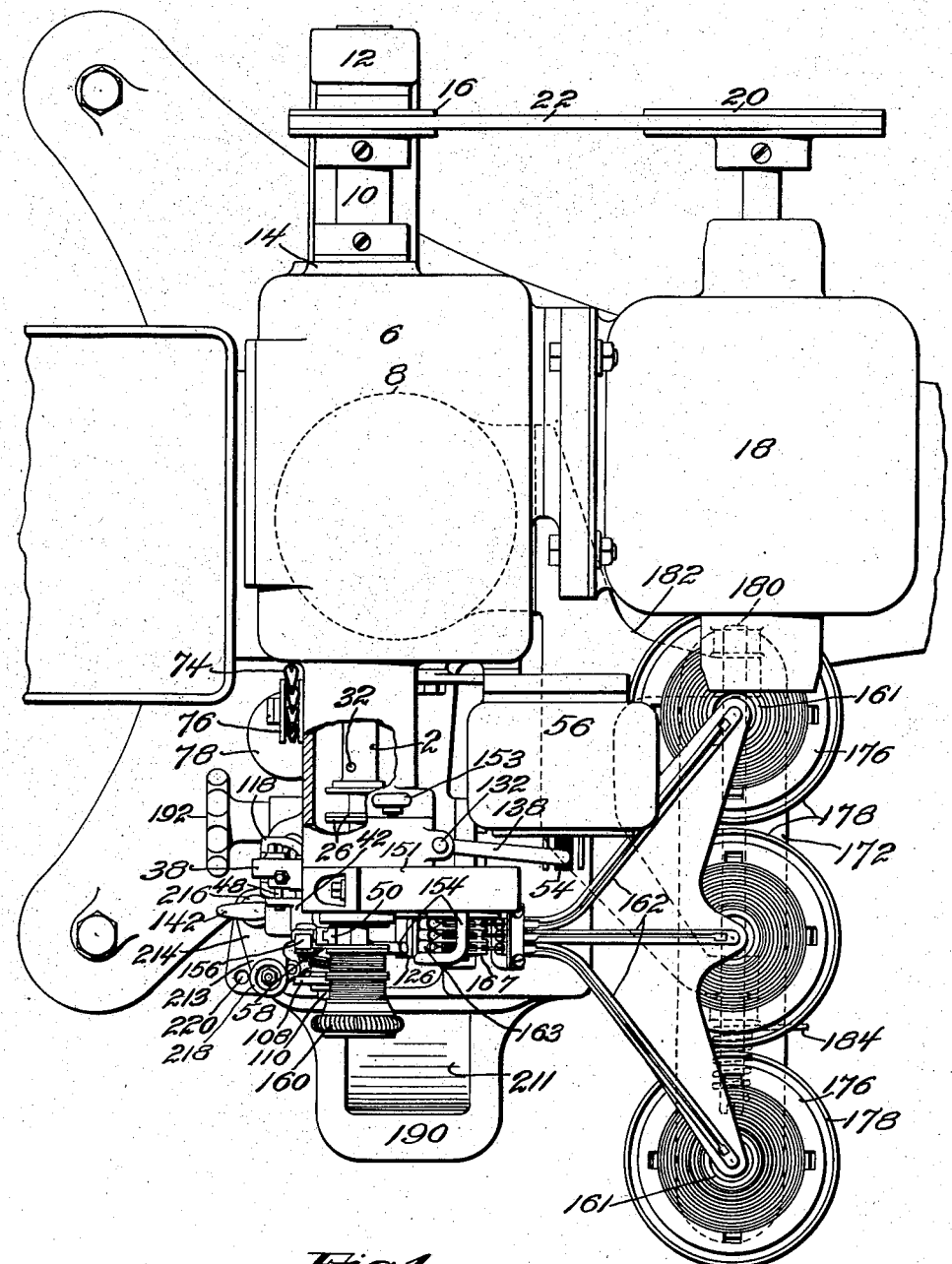

March 14, 1944.　　P. W. SENFLEBEN　　2,343,935
WINDING MACHINE
Filed June 11, 1940　　9 Sheets-Sheet 1

Witness
Jas. J. Maloney.

Inventor
Paul W. Senfleben
by Fish Hildreth
Cary & Jenney Attys

March 14, 1944. P. W. SENFLEBEN 2,343,935
WINDING MACHINE
Filed June 11, 1940 9 Sheets-Sheet 3

Witness
Jas. J. Maloney.

Inventor
Paul W. Senfleben
by Fish Hildreth
Cary & Jenney Attys

Inventor
Paul W. Senfleben
by Fish Hildreth
Cary & Jenney Attys

Witness
Jas J Maloney

March 14, 1944. P. W. SENFLEBEN 2,343,935
WINDING MACHINE
Filed June 11, 1940  9 Sheets-Sheet 7
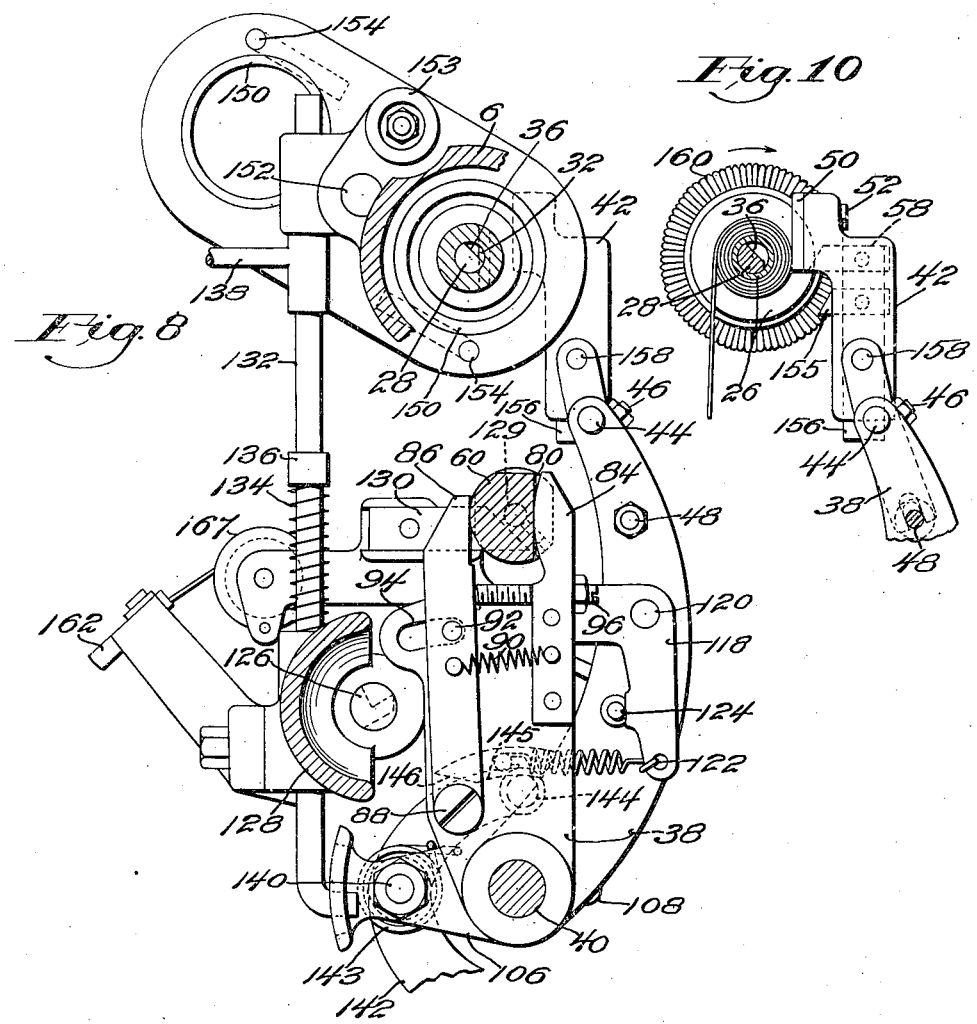
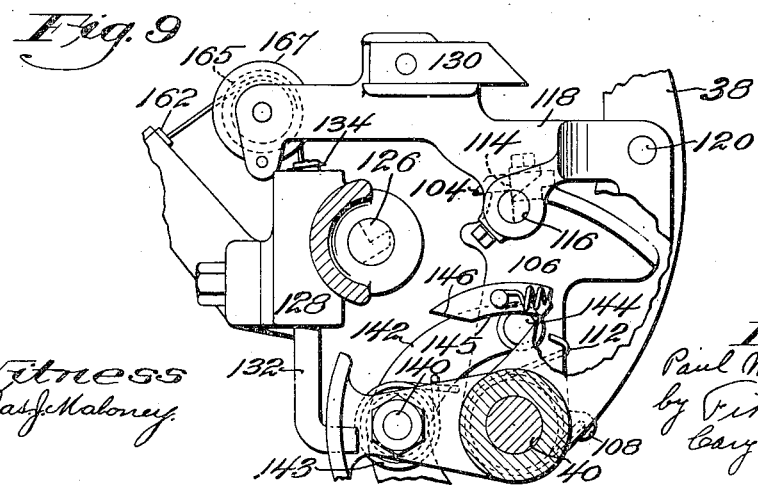

March 14, 1944. P. W. SENFLEBEN 2,343,935
WINDING MACHINE
Filed June 11, 1940 9 Sheets-Sheet 8
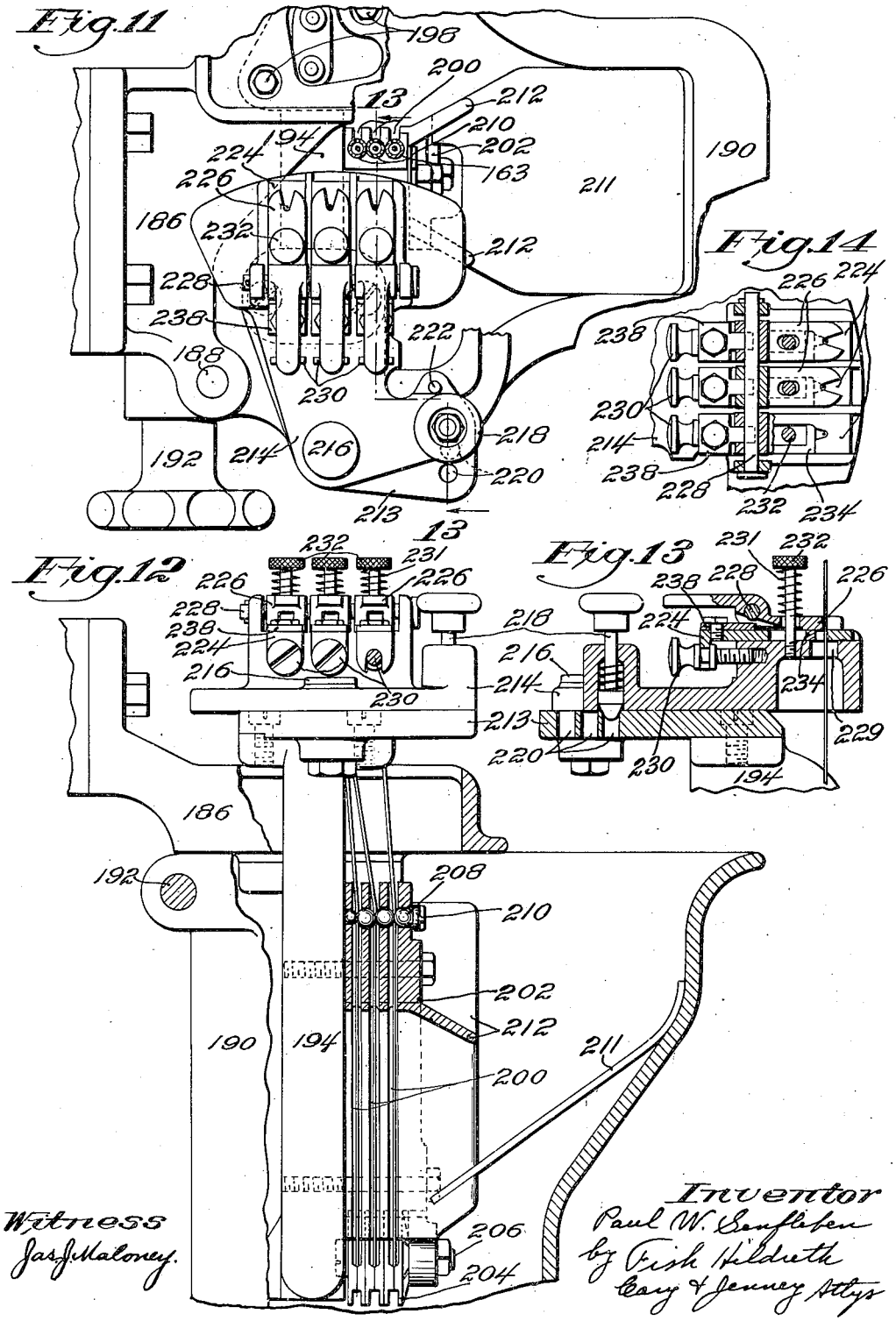

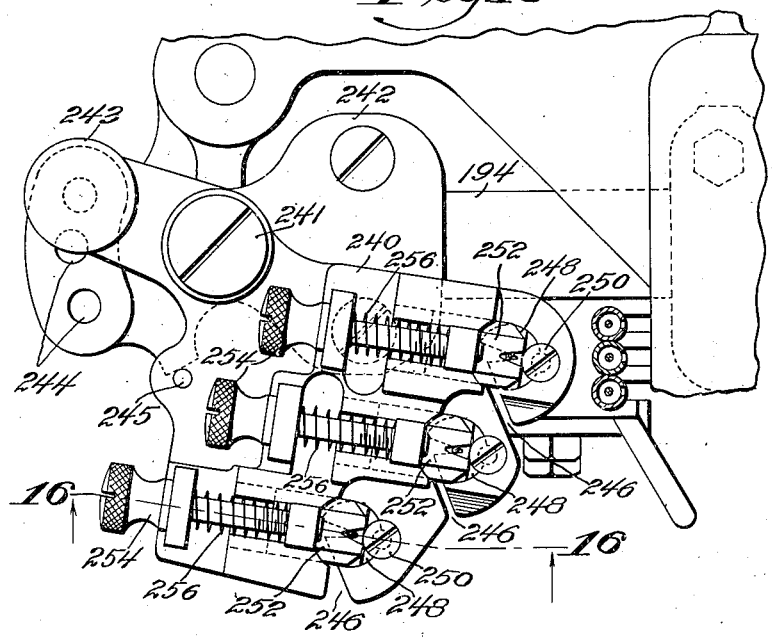
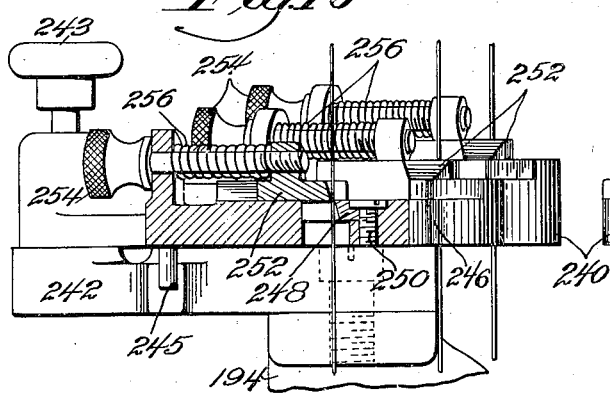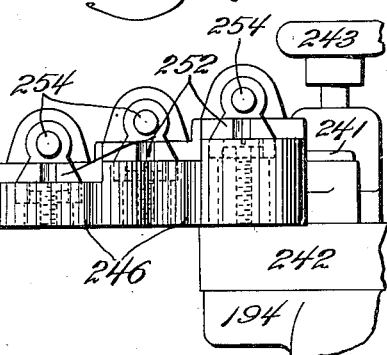
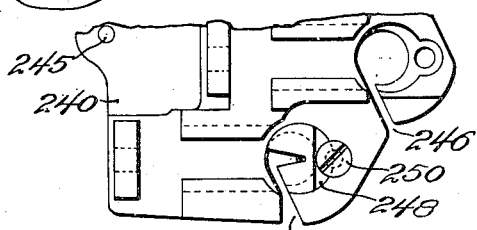

Patented Mar. 14, 1944

2,343,935

UNITED STATES PATENT OFFICE 2,343,935

WINDING MACHINE

Paul W. Senfleben, Malden, Mass., assignor to United Shoe Machinery Corporation, Borough of Flemington, N. J., a corporation of New Jersey Application June 11, 1940, Serial No. 339,903

34 Claims. (Cl. 242—21)

The present invention relates to machines for winding sewing machine bobbins or other thread packages and primarily to that type of winding machine employing flanged bobbins on which thread impregnated with hot wax is wound, although in certain of its aspects, the invention is applicable to winding machines not employing flanged bobbins or hot wax for the thread.

Bobbin winding machines in present day use ordinarily operate to wind a single bobbin at a time, after which winding is stopped and an empty bobbin is substituted for the one filled. Where a large number of bobbins must be filled with thread, as required for the production of sewing machines in a shoe factory, the operations of winding bobbins singly not only consume an unnecessarily large proportion of time for the operators of the sewing machines, but when hot wax is applied to the thread in a melted condition before winding, starting and stopping the machine offers an opportunity for the wax to become cooled and hardened along that section of thread between the bobbin being wound and the thread waxing device so that after the machine is stopped and started, the thread in the first part of a new bobbin may not be wound with the wax in the same uniformly heated condition as after the winding operation has progressed to a point where fresh uncooled wax is drawn quickly from the waxing device.

In order to avoid the necessity of stopping the winding machine for each bobbin, attempts, heretofore, have been made to wind a series of bobbins at a time with a continuous operation, drawing thread from a waxing device into one bobbin after another, without stopping rotation of the bobbin supporting spindle. When bobbins having flanges are wound in this way, it is the usual practice to provide a thread contact member engaging the thread between the flanges of each bobbin as it is being wound to control the winding operation on that bobbin and to cause the winding operation on the adjacent bobbin to be started when the previous bobbin is filled with thread. To permit relative movement of the thread contact member axially of the bobbins from one bobbin to another, each bobbin is filled completely with thread so as to lift the contact member clear of the flanges on the bobbins before relative axial movement between the contact member and the bobbins occurs. However, if the bobbins are filled completely with thread, the thread may project beyond their flanges in some instances so that the filled bobbins will not fit into the thread cases of the sewing machines with which they are employed without first removing some of the thread.

The object of the present invention is to provide a bobbin winding machine in which the difficulties above referred to are eliminated and more particularly to provide a machine for winding a series of bobbins with thread having a hot wax coating in a continuous operation without requiring the bobbins to be filled completely, thus preventing any possibility of thread wastage either from hardening of the wax on the thread before winding or from the necessity of stripping excess thread from between the flanges of a bobbin before it is capable of being used in a sewing machine. Another object is to provide novel and convenient means for controlling the operations of a bobbin winding machine and to avoid the necessity of complicated and difficult manipulations and adjustments on the part of the operator.

With these and other objects in view, the present invention contemplates the provision in a machine for winding a plurality of flanged bobbins in which a thread controller contacts the thread between the flanges of one bobbin at a time to cause the winding of each bobbin to be terminated and the winding on another bobbin to be started, of means acting before each bobbin is completely filled with thread to lift the controller clear of the flanges on the bobbins so that the bobbins and controller may be moved relatively to a new winding position. By lifting the thread controller clear of the bobbin flanges before the bobbins are completely filled, there is no possibility that the thread on any bobbin will project beyond the flanges. Accordingly, no thread needs to be stripped from the bobbin and wasted before fitting the bobbin in the thread case of a sewing machine.

In the machine in which the present invention is embodied, the means for lifting the thread controller also moves the bobbins relatively to the controller so that after the controller is lifted, it will be lowered between the flanges of another bobbin at once, preparatory to a new winding operation. Thus, a winding operation on a series of bobbins may be performed continuously without stopping, the thread not being given a chance to cool or the impregnated wax to harden before winding is started on each bobbin, as where the machine is capable of winding a single bobbin only before stopping. Also, a sewing machine operator using the present winding machine is enabled to wind a supply of bobbins sufficient for a large number of sewing operations practically as quickly as required formerly in filling a single bobbin.

In the preferred form of this feature of the invention, the means for actuating the controller in the manner referred to comprises a yieldingly actuated ratchet bar connected to be released by the controller and the ratchet bar causes the series of bobbins, supported on a suitable winding spindle, to be moved in step-by-step relation to the controller, the distance between successive bobbins on the spindle. To lift the controller clear of the flanges on the bobbins, the ratchet bar is provided with cam surfaces which act only after relative movement of the bobbins and controller is started. To prevent the flanges on the bobbins from holding up the movements of the bobbins by contact with the controller, the means for yieldingly actuating the ratchet bar is so arranged and connected that the ratchet bar will be advanced relatively to the spindle during each step-by-step movement to cause the controller to be lifted clear of the flanges on the bobbins with certainty.

A form of construction in which the feature of the invention relating to the ratchet bar resides comprises an escapement arm having a pawl and detent connected to the thread controller and engaging holding and stop notches in the ratchet bar in such relation to the pawl and detent that the ratchet bar may be moved a short distance after being disengaged by the detent and before being stopped by the pawl to prevent the detent from re-entering the same notch in the ratchet bar.

Figure 2:
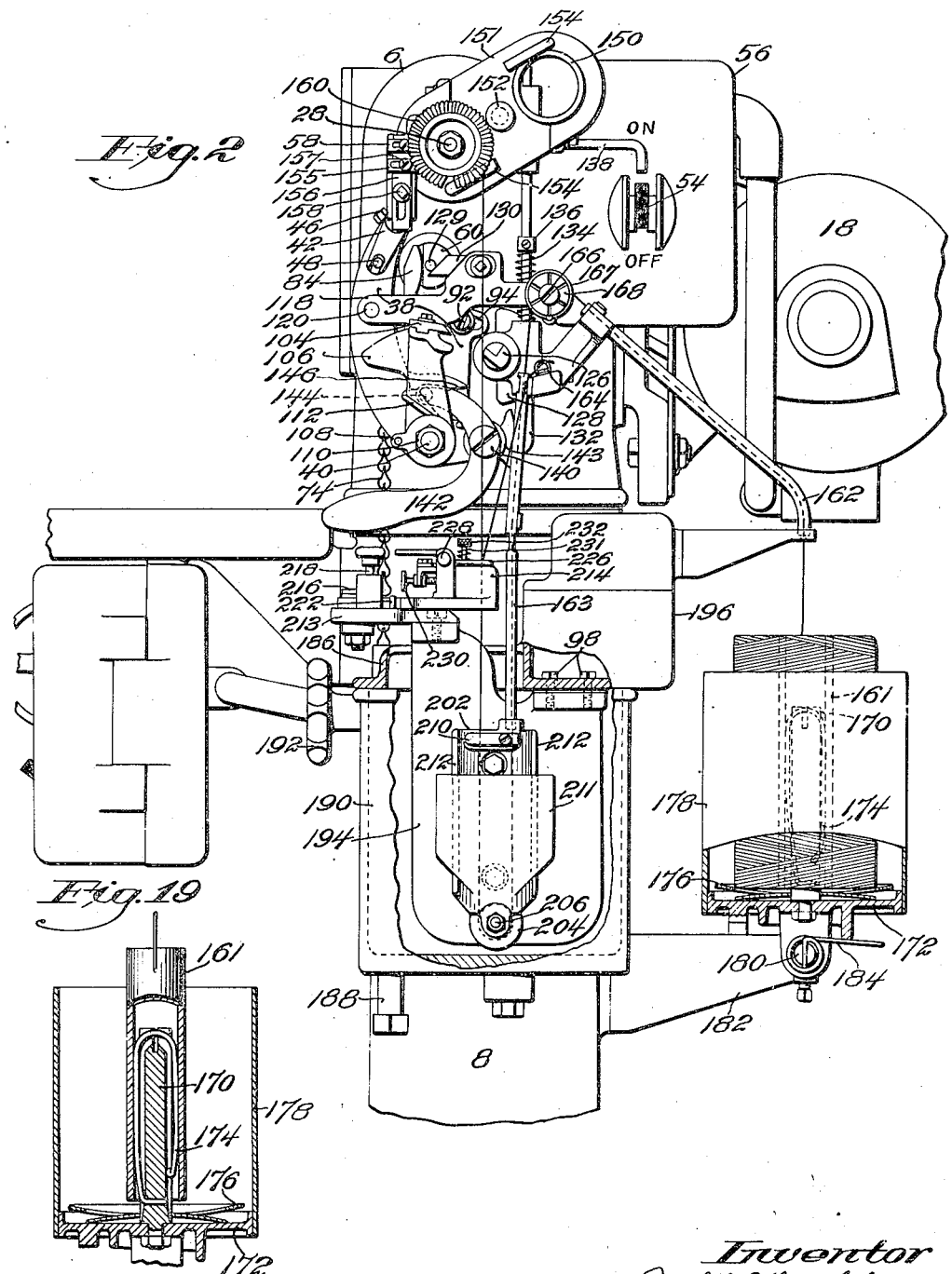
Figure 3:
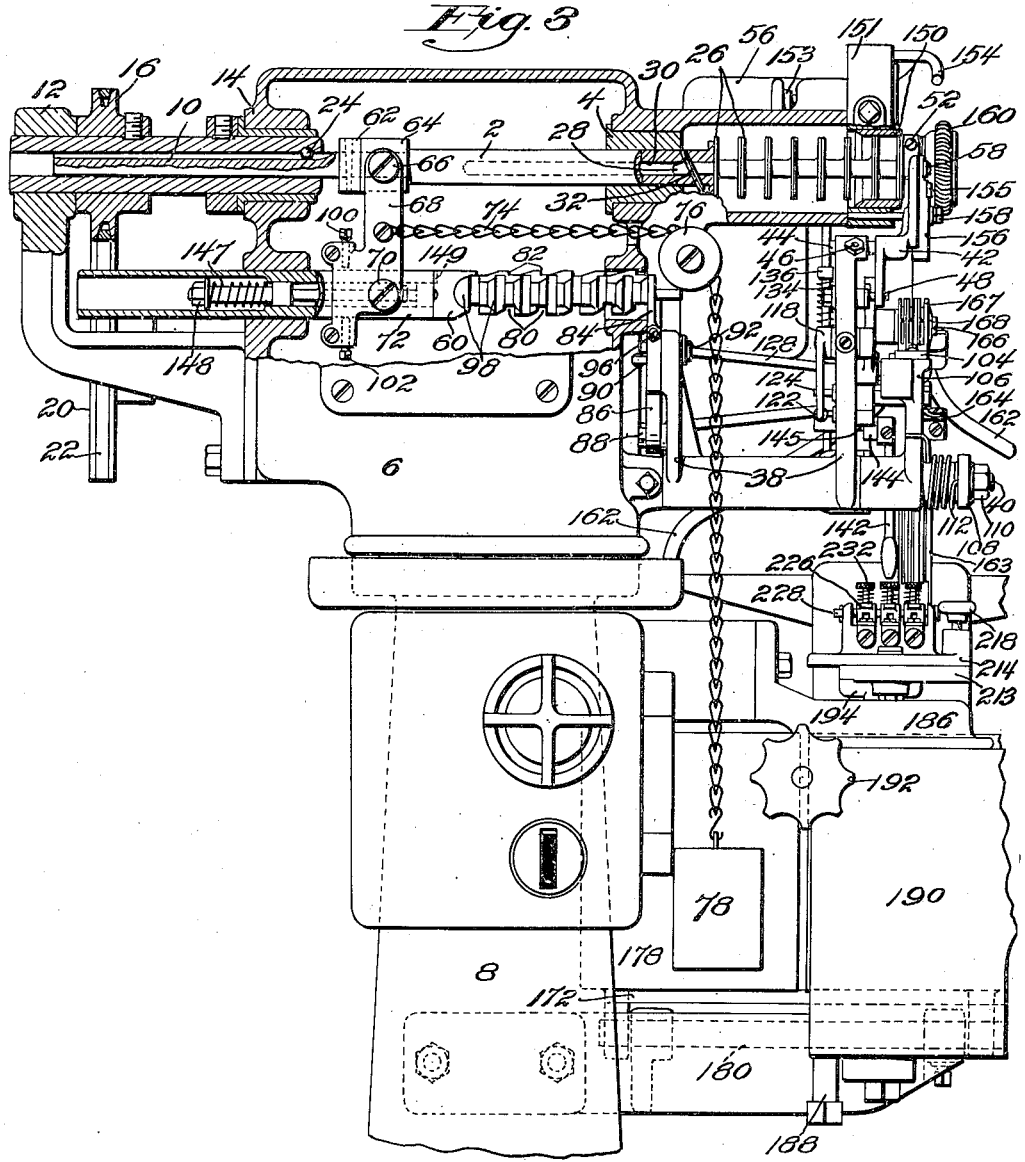
Figure 4:
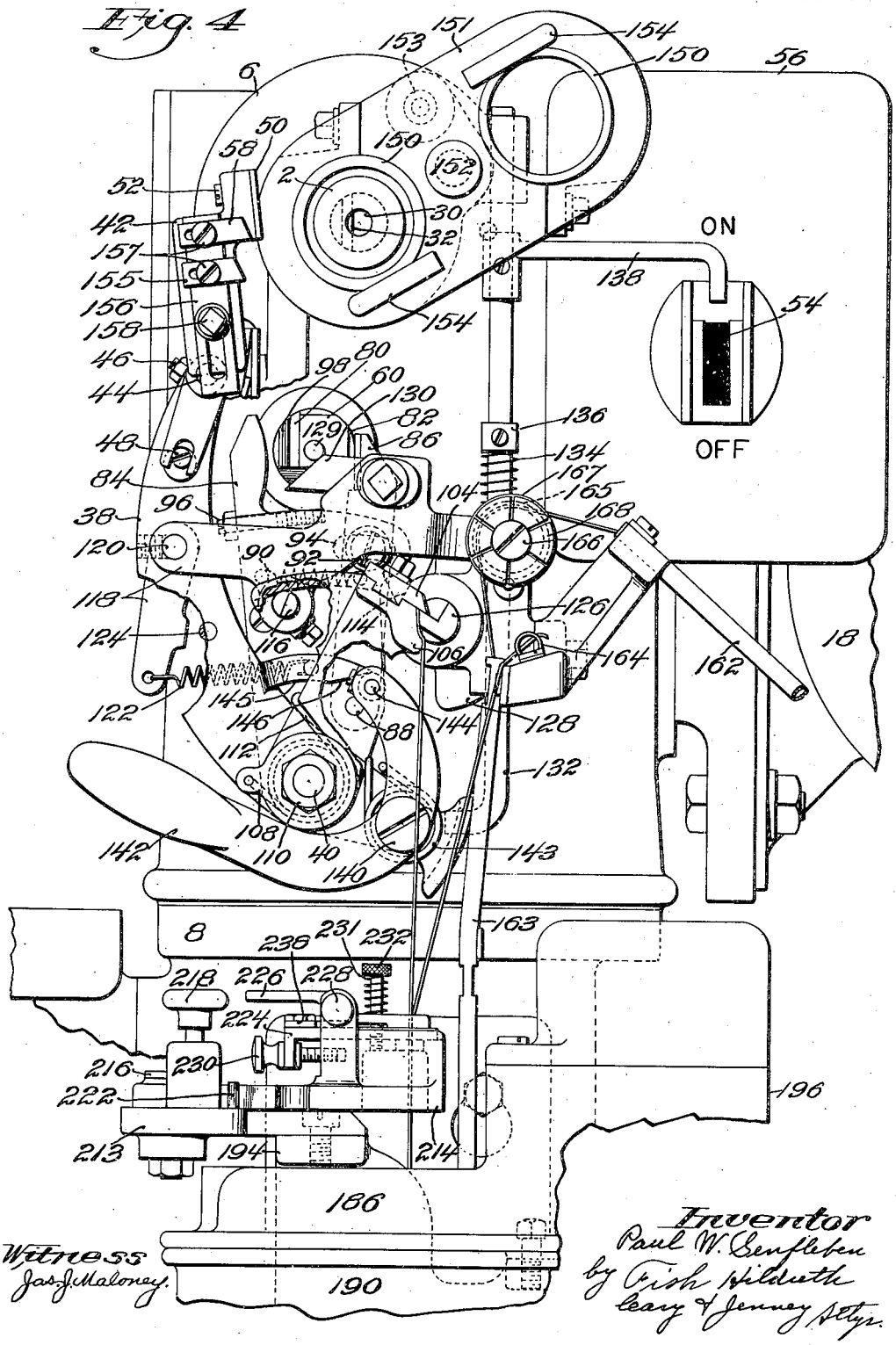
Figure 5:
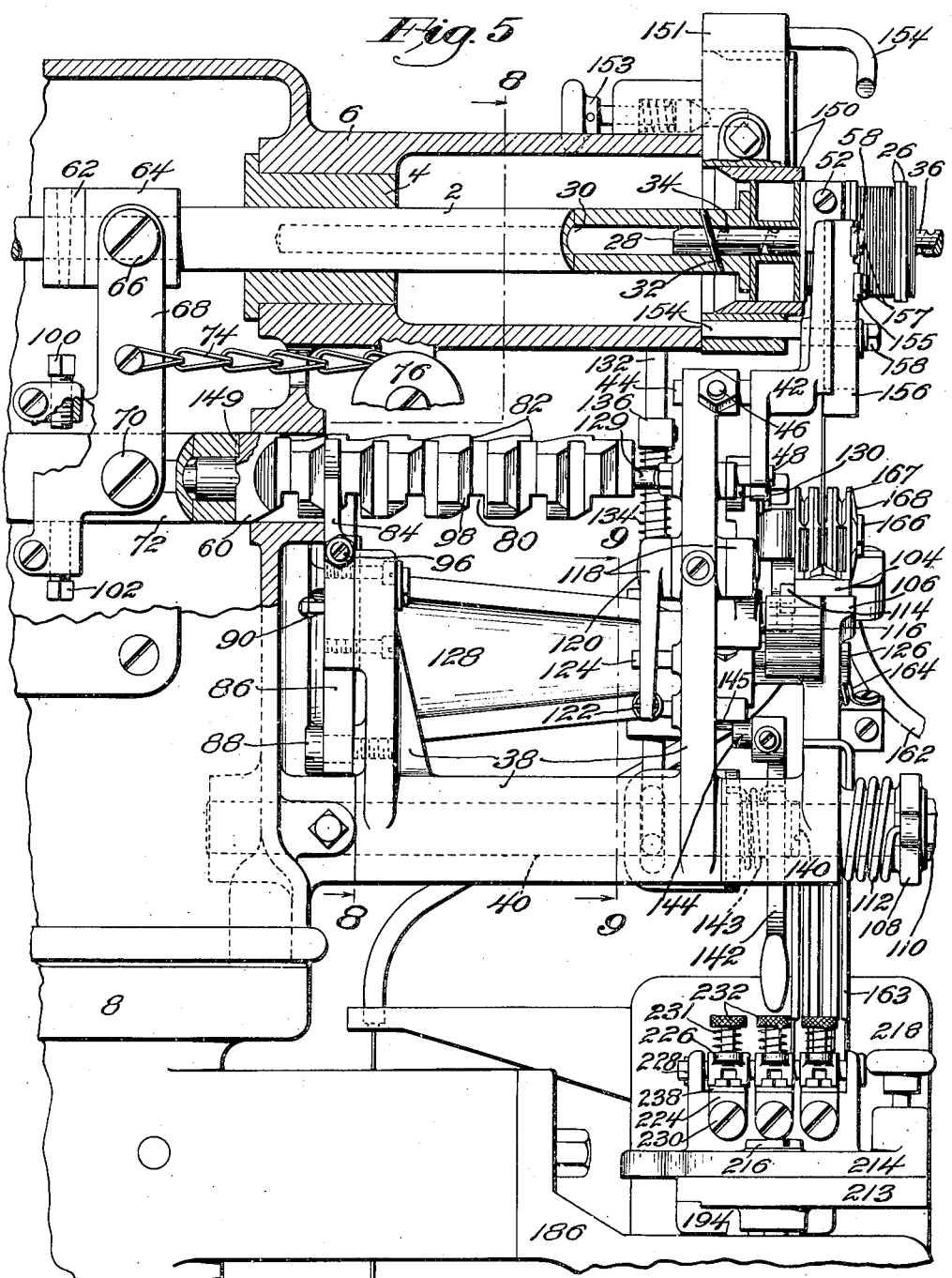
Figure 6:
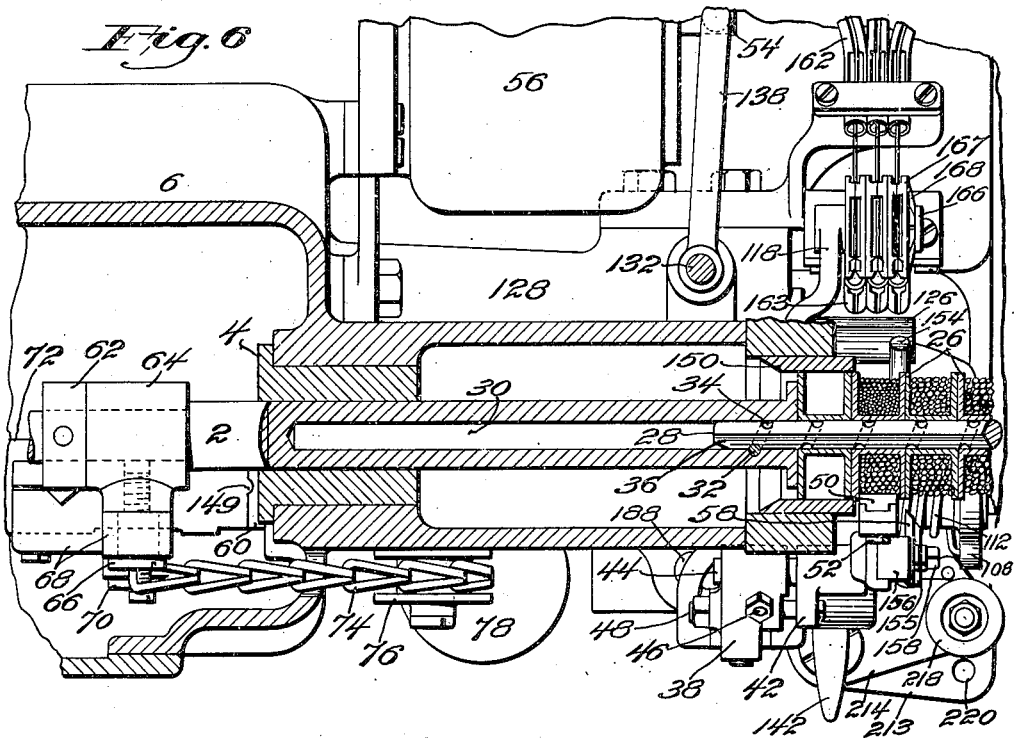
Figure 7:
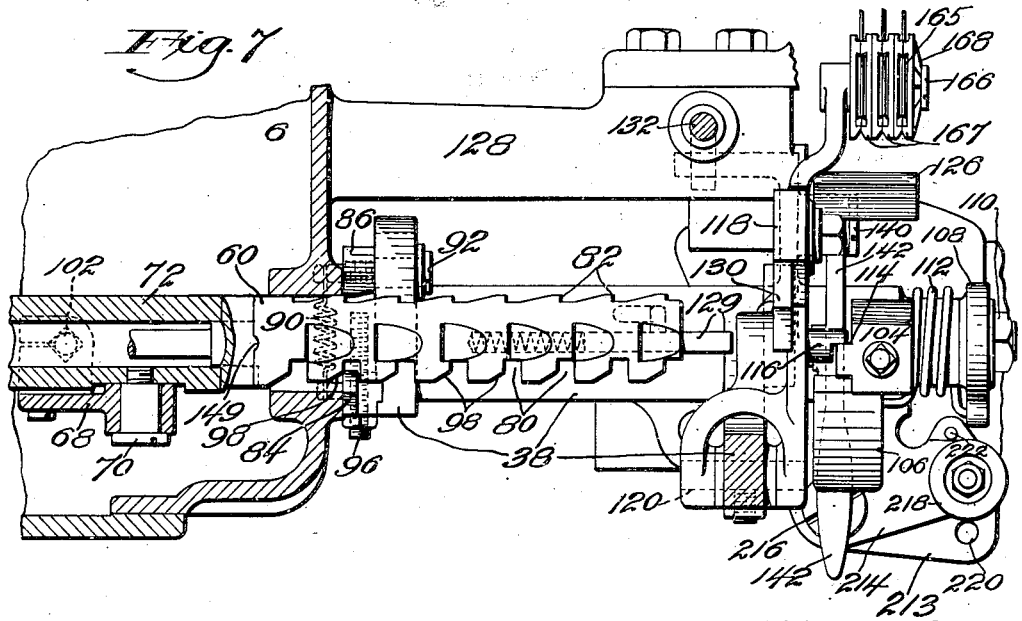

These and other features of the invention relating to certain constructions, combinations and arrangements of parts will be clearly understood from the following detailed description taken in connection with the accompanying drawings, in which Fig. 1 is a plan view, partly broken away and in section, of the principal parts of a multiple bobbin winding machine embodying the features of the present invention; Fig. 2 is a view in right side elevation of a portion, with some of the parts broken away, of the winding head of the machine illustrated in Fig. 1 taken during a winding operation; Fig. 3 is a view in front elevation of the winding head, with the parts surrounding the winding spindle shown in section, taken before the winding operation is started Fig. 4 is a view similar to Fig. 2, on an enlarged scale, with some of the parts broken away, illustrating the positions of the parts after a winding operation has been completed and the wound bobbins removed; Fig. 5 is a view on a still further enlarged scale, similar to that shown in Fig. 3, of the parts at the right side of the winding head after the winding operation is started; Fig. 6 is a sectional plan view on the same scale as Fig. 5, showing more particularly the winding spindle of the machine; Fig. 7 is a sectional plan view illustrating more particularly the ratchet bar for causing the correct step-by-step spacing movements to be imparted to the winding spindle; Fig. 8 is a sectional view taken along the line 8—8 of Fig. 5; Fig. 9 is a further sectional view taken along the line 9—9 of Fig. 5; Fig. 10 is a detail sectional view illustrating the relation of the thread controller with the bobbin being wound; Fig. 11 is a plan view of a portion of the wax pot including a series of interchangeable wax strippers employed therewith; Fig. 12 is a view in partial section of the wax pot illustrating the heating element and thread guides; Fig. 13 is a detail sectional view of the wax strippers taken along the line 13—13 of Fig. 11; Fig. 14 is a sectional plan view of the wax strippers; Fig. 15 is a plan view on an enlarged scale of a modified form of stripper construction which may be substituted for that illustrated in Figs. 11 to 14, inclusive; Fig. 16 is a sectional view of the form of stripper illustrated in Fig. 15 taken along the line 16—16; Fig. 17 is a view in side elevation of the form of stripper illustrated in Fig. 15; Fig. 18 is a detail plan view of a part of the modified form of stripper; and Fig. 19 is a sectional detail view of the thread supply holder.

The winding machine disclosed herein is provided with a rotating winding spindle to which a series of empty bobbins may be attached. The machine, after being started, is arranged automatically to wind bobbins on the spindle, each with a predetermined depth of waxed thread, without filling the bobbins completely, the winding operation being transferred from one bobbin to another successively, while the spindle rotates continuously, until all the bobbins are wound. After the winding operation is completed, the thread extending from the last bobbin wound is severed, and the winding spindle brought to rest. During winding, a single length of thread passes from one bobbin to the next in the series, and the thread between bobbins is severed directly after winding each bobbin so that when the machine comes to rest and the bobbins removed from the spindle, they will be ready for immediate use. Quickly adjustable devices are also provided to accommodate interchangeably bobbins of two sizes differing both in outside diameter and in length.

Referring more particularly to Fig. 3 of the drawings, the winding spindle is indicated at 2 supported in a bearing 4 in a main frame 6 carried at the upper end of a base column 8. The spindle 2 is mounted to move lengthwise of its bearing, as well as to be rotated and is guided at one end in a hollow drive shaft 10 rotatably mounted in bearings 12, 14 in alignment with the spindle bearing 4. The drive shaft 10 is rotated through a pulley 16 secured to the drive shaft and a motor 18 having a pulley 20 about which and the pulley 16 a belt 22 passes. The driving connection between the shaft 10 and the spindle consists of a ball 24 inside the drive shaft engaging a lengthwise groove in the spindle 2. To secure a series of bobbins indicated at 26 to the spindle, a headed mandrel 28 passes through the bobbins and into a central bore 30 in the spindle. The spindle has passing diagonally through its bobbin supporting end a pin 32 forming an incomplete thread-like element cooperating with any one of a number of screw thread grooves 34 (see Figs. 5 and 6) in the outer surface of the mandrel. One side of the mandrel is ground off to form a flat surface 36 which will clear the pin 32 when the mandrel is inserted in the right relation to the spindle and the screw thread grooves 34 are so cut that any number of empty bobbins from one to eight may be applied to the mandrel and secured to the spindle with a partial rotation only of the mandrel relatively to the spindle.

With a series of empty bobbins secured to the spindle, preparation is made for a winding operation by moving the spindle with the bobbins lengthwise of the spindle until the first bobbin of the series is in the same plane radially of the spindle and mandrel with the thread contacting end of a thread controller comprising a lever 38 having an elongated hub loosely mounted on a shaft 40 secured to the frame 6 in parallel relation to and below the winding spindle 2. At the upper end of the lever 38 is an offset carrier 42 (see Fig. 5) supported on the lever by means of a pin 44 adjustably clamped to the upper end of the lever by a bolt 46, and held from rotation about the pin by the eccentric end of a stud 48 adjustably secured in the lever. The thread contacting end of the controller consists of a removable plate 50 attached by a screw 52 (see Fig. 10) to the offset carrier 42 in such relation that it will enter a space between the flanges of a bobbin held in winding position. The plate 50 is shaped to engage in a tangential relation the outer layer of thread between the flanges of a bobbin and terminates in the direction of spindle rotation at a location where the thread on the bobbin wipes the surface at the lower part of the plate to prevent any accumulation of wax. The controller plate is held yieldingly against the thread on a bobbin by means more fully described hereinafter.

The winding operation is started by applying the thread to the first bobbin after being located in alignment with the thread controller. The circuit of the motor is completed by operating a handle lever 54 on a motor control switch 56. As the bobbin begins to fill (Fig. 10), the thread lifts the thread controller until the desired depth of thread is wound. Thereafter, the thread controller is lifted away from the thread and from between the flanges of the bobbin and the series of bobbins is moved relatively to the thread controller until the second bobbin of the series comes into alignment with the thread contacting end of the controller. The thread contacting end of the controller is then brought between the flanges of the second bobbin and the thread having been led meanwhile into the second bobbin, actuates the controller a second time. These movements are repeated until all the bobbins on the spindle are wound with thread. Just after the thread is engaged with the second bobbin of the series, a knife 58 adjustably secured to the carrier 42 moves between the adjacent flanges of the first and second bobbin of the series and severs the thread crossing the flanges between the two bobbins, the mechanism for moving the bobbins and thread controller being arranged to cause several turns of thread to be wound on the second bobbin before the thread controller and knife 58 move to operative positions. After all the bobbins are wound with thread, the thread leading to the last filled bobbin is severed and the motor control switch operated to disconnect the motor circuit.

To lift the thread contacting end of the thread controller clear of the flanges on the bobbins and to move the bobbins and spindle lengthwise of the spindle relatively to the thread controller, according to the features of the present invention, the spindle is connected to a ratchet bar 60 slidingly mounted in the frame 6 beneath the spindle and arranged to be shifted yieldingly with the spindle. On the central part of the spindle, there is loosely mounted between a shoulder on the spindle and a collar 62, a bushing 64 pivotally connected by a screw stud 66 with the upper end of a link 68, the lower end of which is pivotally connected by a screw stud 70 with a hollow bar 72 to the end of which the ratchet bar 60 is connected. The mid-point of the link 68 is connected to a yieldingly actuated member comprising a chain 74 passing over a pulley 76 and supporting at its lower end a weight 78. When the thread controller is lifted clear of the bobbin flanges and the ratchet bar released, the weight and chain move the bobbins on the spindle the distance between adjacent bobbins preparatory to a new winding operation.

The ratchet bar is formed with two pairs of rows of notches, of which only one pair of rows is operative at a time, the rows of each pair being cut into opposite sides of the bar. Each pair of rows is displaced about the bar 90° from the other and consists of a row of holding notches 80 (see Figs. 5, 7 and 8) and a row of stop notches 82 arranged to cooperate with a pawl 84 and a detent 86 carried by an escapement arm of the lever 38. The pawl 84 is secured rigidly to the escapement arm of lever 38 but the detent 86 is pivoted to swing towards and from the pawl about a stud 88. To hold the detent against the ratchet bar, a spring 90 is connected between the detent and the pawl, the detent having a pin 92 which passes through a slot 94 in the escapement arm to limit the movement of the detent.

The operation of the escapement arm on the ratchet bar consists in causing the detent to be engaged yieldingly with a stop notch in the bar when the pawl is withdrawn and the detent to be forced out of the stop notch when the pawl enters a holding notch in the bar. To adjust the time of engagement and disengagement of the detent with relation to the pawl, a set screw 96 threaded in the pawl acts as a stop for the detent. Thus when the pawl leaves a holding notch, the bar is released and the weight moves the bar and bobbin spindle a distance equal to that between successive bobbins when the detent engages a stop notch 82. At this time, the pawl is in alignment with a holding notch 80 and the controller arm is free to swing with the escapment arm until the pawl enters the holding notch with which it is aligned. When the pawl enters a holding notch, the detent is disengaged from the ratchet bar and the relations between the pawl and detent and the notches on the ratchet bar are such that the ratchet bar moves slightly after the detent is disengaged before being stopped by the pawl to prevent the detent from again entering the same notch in the ratchet bar upon release of the ratchet bar by the pawl after a bobbin is filled with thread. The ratchet bar and spindle therefore are moved substantially the full distance between successive bobbins before being stopped by the detent.

To lift the thread controller clear of the flanges on the bobbins before each bobbin is completely filled with thread, there is formed a cam surface 98 at the rear of each holding notch 80. These cam surfaces are so shaped that when the pawl is forced part-way out of a holding notch by the thread on a bobbin and the pawl reaches the edge of a cam surface, the yielding force of the weight on the ratchet bar will cause the pawl to be carried up over the cam surface, lifting the thread controller arm and the contact plate 50 from between the flanges of the bobbin being wound. The thread controller arm is held in this position until a new holding notch comes into alignment with the pawl. This occurs, as previously explained, when the shoulder on a stop notch 82 engages the detent 86.

To prevent the engagement of the flanges on the bobbins with the contacting plate 50 on the controller arm from blocking the movement of the ratchet bar, the link 68 connecting the spindle and the ratchet bar (see Fig. 5) is arranged to permit slight relative movement between the winding spindle 2 and the ratchet bar 60. The weight operated chain 74 being connected at a mid-point between the pivot studs 66 and 70 for the link causes the ratchet bar to be advanced ahead of the spindle whenever the spindle is held up briefly in its movement relatively to the controller arm by engagement of the bobbin flanges with the thread contacting plate. The amount of movement between the spindle and ratchet bar is regulated to insure that the cam surfaces 98 have an opportunity to become fully effective in lifting the thread controller arm before movement of the ratchet bar is blocked by reason of its connection with the winding spindle. To regulate the relative movement between the winding spindle and the ratchet bar, the link 68 has a pair of set screws 100 and 102 at diametrically opposite sides of the ratchet bar, the set screw 102 locating the positions of the spindle and ratchet bar during winding operations and the set screw 100 acting to limit the amount of relative movement when endwise movement of the spindle is held up. When the endwise movement of the spindle stops, the end of a cam surface 98 is reached so that the thread controller arm is again brought between the flanges of the next succeeding bobbin.

To sever the thread after the winding operation on the last bobbin is completed, a spring actuated thread cutter is provided. The thread cutter comprises a sharp-edged plate 104, seen in Fig. 4, having a rib secured in a groove at the free end of an arm on a cutter lever 106 rotating loosely on the end of shaft 40 and held from endwise movement on the shaft by the hub of the controller lever 38 on one side and a collar 108 clamped in place against a shoulder on the shaft by a nut 110 on the other side. The spring for actuating the cutter is indicated at 112 coiled around a hub of the cutter lever with one end hooked around the cutter lever and the other end held in an opening of a lug on the collar 108. To hold the cutter in inoperative position during winding operations, the cutter plate 104 is formed with a shoulder 114 (see Fig. 7) arranged to be engaged by a flat sided pin 116 secured in a latch arm of a cutter retaining lever 118 pivoted on a pin 120 secured in the control arm of lever 38. The lever 118 has a downwardly extending arm connected at its lower end with a spring 122 fastened to the controller arm. The spring 122 acts to swing the retaining lever 118 in a direction to latch the pin 116 behind the shoulder 114 of the cutter plate. When in latching position, the lever is held by the spring 122 against a pin 124 in the controller arm of lever 38. When the retaining lever 118 is moved in the other direction, the cutter is released and severs the thread against an anvil rod 126 projecting from a horizontal bracket 128 on the main frame 6. The anvil rod 126 is sharpened somewhat along one edge to act with the cutter plate in shearing the thread and has a flattened surface to hold the supply end of the severed thread between the cutter arm and the rod. To hold the latch arm of retaining lever 118 depressed with the latch pin 116 below the level of the shoulder 114 on the cutter plate after the cutter is actuated so that the cutter may readily be relatched, a forwardly extending flanged projection on the cutter lever 106 overlies the pin 116, the flange on the projection being substantially concentric with the path of movement of the cutter plate.

To actuate the cutter latch arm of the retaining lever 118 after the last winding operation is completed, the end of the ratchet bar 60 is provided with a spring-pressed pin 129 which, when the final bobbin of a series is moved into winding position, projects into the path of a cam block 130 adjustably secured to the retaining lever 118. As the controller arm is moved outwardly at the end of the final winding operation, the cam block 130 moves against the pin 129 and forces the latch arm of the retaining lever downwardly to release the cutter. The severed end of thread connected with the last filled bobbin is then carried by a continued rotation of the winding spindle about the last filled bobbin.

For stopping rotation of the winding spindle after all the bobbins are wound with thread, the cutter lever 106 has a rearwardly extending slotted arm, into the slot of which the bent end of a vertically sliding rod 132 projects. The rod 132 is supported loosely in aligned openings of lugs on the main frame and on the bracket 128 and is normally held in raised position by a compression spring 134 coiled about the rod between the bracket 128 and a collar 136 on the rod. Near the upper end of the rod is secured a right angle bar 138 with its end overlying the handle 54 on the motor switch. When the cutter lever 106 is actuated, the slotted arm of the lever forces the rod 132 downwardly against the spring 134 and flips the motor switch to "off" position. At the same time the cutter is operated, the thread controller is lifted still further away from the winding mandrel and held in position free of the flanges on the bobbins.

To press the thread contacting plate 50 yieldingly against the thread during winding, the force of the cutter spring 112 acts against the latch pin 116 through the retaining lever 118 on the controller arm of lever 38 urging the pawl 84 against the ratchet bar at the same time. After the cutter arm is released to sever the thread, the force of the spring 112 no longer presses the controller towards the thread. To lift the controller away from the thread on the last bobbin wound, after the cutter is released from the retaining arm, the flanged arm of the cutter lever 106 has a pivot screw 140 for a U-shaped resetting lever 142 about the hub of which is coiled a spring 143 having its ends hooked about the cutter lever and the resetting lever, respectively. One end of the resetting lever carries a pin 144 which rests against an arcuate surface 145 of a projecting portion of the controller arm during winding operations. When the cutter is actuated, the pin 144, which is urged upwardly by the spring 143, is carried beyond the end of the arcuate surface 145 to an inclined cam surface 146 on the projecting portion of the controller arm. The force of the spring 143 then raises the pin 144 and presses the controller arm forwardly until carried to a position clear of the bobbin flanges. The mandrel holding the wound bobbins may then be removed and other bobbins substituted.

The means for rendering the machine capable of operating upon more than one size of bobbins without complicated or difficult changes includes a rotatable joint between the ratchet bar 60 and the hollow bar 72 to which the ratchet bar is connected in alignment. The ratchet bar has a reduced terminal fitting within the hollow bar 72, illustrated more clearly in Figs. 3, 5 and 7. Surrounding the terminal of the ratchet bar is a compression spring 147 held in place between an internal shoulder in the hollow bar 72 and a nut 148 on the end of the terminal of the ratchet bar. The spring 147 holds an external shoulder on the ratchet bar yieldingly against the end of the hollow bar 72 with a radial rib 149 on the end of the hollow bar in engagement with one of two radial grooves on the shoulder of the ratchet bar. By this means, the ratchet bar, when turned, is held in either of two positions, with either pair of notch rows cooperating with the escapement arm, the notches of the two pairs of rows being spaced different distances corresponding to the lengths of bobbins of two different sizes.

A supporting bearing for the flanges of the bobbins being wound is provided close to the thread controller so that the tension on the thread during winding operations will not cause the mandrel to be strained unduly. There are provided two of these bearings, indicated in Fig. 4 at 150, in the form of tubular members, each loosely fitting outside the flanges of one size of bobbin and arranged to be interchangeably located in operative position in alignment with the winding spindle. To permit quick interchange of the bearings 150, they are mounted on a plate 151 rotatable on a stud 152 and provided with recesses at one side for receiving the end of a spring-pressed plunger 153 slidable in the machine frame to hold the plate in either of two positions. Also mounted on the plate are two similar L-shaped thread guide fingers 154, either of which may be operative to direct the thread across the flanges of the bobbins when the winding spindle is moved lengthwise.

To sever the thread between bobbins of different lengths, there is adjustably mounted on the controller carrier 42, in addition to the knife 58, a second knife 155 spaced lengthwise of the spindle from the knife 58, as more clearly indicated in Fig. 5. For adjusting the knives, both knives are slotted horizontally and secured to a vertically slotted block 156 by screws 157 passing through the knives. The block 156 is in turn clamped to the carrier 42 by a bolt 158 passing through a vertical slot in the block. When making changes to wind bobbins of different sizes, the bolt 158 is loosened and the block is moved vertically to render the desired knife effective and the other knife to be moved out of operative position. As illustrated in Fig. 4, the knife 58 is in operative position in line with the spindle and knife 155 in inoperative position.

After applying a new series of empty bobbins to the mandrel and securing the mandrel to the winding spindle, the operator of the machine presses the bobbins and spindle endwise towards the left of the machine to raise the weight 78 and to locate the first bobbin at the right end of the mandrel in winding position where it is held by the detent 86 acting on the ratchet bar. The thread cutter is then reset by actuating a handle on the projecting end of the resetting lever 142 until the latch pin 116 on the retaining lever snaps behind the shoulder 114 on the cutter plate. This movement also raises the switch actuating rod 132 to inoperative position. As soon as the operator releases the handle of the resetting lever 142, the force of the cutter spring 112 urges the thread controller towards winding position between the flanges of the first bobbin. As soon as the thread controller is moved to operative position, the pawl 84 enters a stop notch in the ratchet bar and the detent is released with the ratchet bar and bobbins still held in substantially the same positions. The thread which has been released by the cutter is now carried between the flanges of the first bobbin and its free end temporarily secured between the coils of a continuous coil spring 160 fitting within a groove in the head of the mandrel 28. The coils of the spring are spaced sufficiently close together to pinch the thread between them and also form a convenient handle of circular shape on the mandrel with an effective gripping surface. With the end of thread in winding position on the first bobbin of the series, it is only necessary to start the motor by operating the switch handle 54 and the machine will automatically be brought to rest after all of the bobbins have been wound.

Thead is supplied to the bobbins from any one of three similar thread supply holders arranged in a row at the rear of the machine, as best shown in Fig. 1. The thread is contained in three self-sustaining cops of similar construction, each having a central fibre support tube 161 of the usual construction. The threads are led endwise from the cops and pass through converging slotted guide tubes 162 into parallel relationship, downwardly through slotted tubes 163 into a common electrically heated wax pot and upwardly towards the winding spindle. In order to keep the threads from the two supplies not being used in readiness for subsequent winding operations, without the necessity of rethreading the wax pot, the upwardly extending ends of the unused threads are secured in supplemental holding means comprising the coils of a spring 164 secured to the frame of the machine close to the thread cutter 104 so that after any of the threads have been severed, the end may be retained temporarily without drawing thread from the supply to which it is connected or allowing any slack or looseness in the thread such as would be likely to become entangled with the thread being used.

It will be noted that the cutter 104 acts to sever the thread at a location between the wax pot and the winding position of the thread controller plate 50. In order to prevent the threads from becoming broken at any other location, requiring the wax pot to be rethreaded, in addition to severing the thread at the end of the winding operations, the cutter is caused to act upon the occurrence of excessive tension in the thread from any cause. To this end, the threads leaving the tubes 162 and before entering the wax pot pass over three aligned pulleys 165 rotatable on a bolt 166 secured in the free end of the cutter retaining arm of lever 118. To retain the threads on their respective pulleys, each pulley is surrounded by a split thread retaining cage 167 having contacting lugs between which the threads may be pressed in threading the pulleys. To maintain the lugs of the split cages in contact with each other, a spring washer 168 is supported at one end of the bolt 166 acting in a direction endwise of the bolt to press the cages and pulleys together. When excessive tension occurs in any thread being used, the cutter is actuated by depressing the retaining arm of lever 118, disengaging the latch pin 116 from the cutter plate. The actuation of the cutter by the thread may be caused either by a knot becoming caught between the thread cage 167, by snarling of the thread in the supply or by exhaustion of the supply. In the type of supply indicated where a self-sustaining cop wound on a tube 161 is employed, the usual practice is to fasten the final end of thread to the tube. When the supply of thread is exhausted, the end being held by the tube causes excessive tension to be applied and the cutter actuated. To support the supplies of thread, the central tubes 161 of the supplies are mounted on pins 170 fixed at their lower ends in a frame 172 and with their free ends arranged substantially in alignment with the lower ends of the respective thread guide tubes 162.

To prevent the tubes 161 from being pulled from the pins 170 when the supplies are exhausted, each pin is grooved along diametrically opposite sides to receive a hairpin spring 174, one end of which is bent at right angles and is received in a diametrical passage through the base of the pin 170. The hairpin spring engages frictionally with the inside of the tube so as to cause sufficient resistance against withdrawal of the tube by the tension on the thread when the supply is exhausted to actuate the cutter retaining arm without breaking the thread.

When the cops of supply thread are supported on the pins 170 in this way, the thread, as it is being unwound, has a tendency to fly out through the action of centrifugal force and to become trapped between the shoulder formed by the shape of the cop at its lower end and the frame 172. To guard against trapping the thread beneath the shoulder of the thread cop as the thread is being unwound, a dished washer 176 (see Fig. 19) having flat spring elements struck out of the main body portion of the washer resting on the frame 172, presses against the under side of the cop to block the entrance of thread. The frame of the supply holder also has a cylindrical guard 178 fitting disk-shaped portions of the frame 172 to reduce the centrifugal effect of the thread as it is being unwound.

To facilitate the application of the thread cops to the supply holders, the supply frame 172 may be tilted to clear the lower ends of tubes 162 and is formed with downwardly extending perforated lugs through which a horizontal rod 180 passes, pivotally supporting the supply frame on a bracket 182 extending rearwardly from the machine base 8. The frame is held on the rod in horizontal position with the cop supporting pins 170 in alignment with the lower end of their thread guide tubes 162 by a spring 184 coiled about the rod with one end secured to the rod and the other engaging the frame. A projecting surface on the frame engages a corresponding lug on the bracket 182 to limit the movements of the frame by the spring 184.

The wax pot is mounted at one side of the base 8 of the illustrated machine on a bracket 186 having a suitable opening through which the thread passes and a vertical rod 188 extends downwardly from the bracket to support slidingly a wax containing receptacle 190. The rod 188 passes loosely through a vertical passage in one side of the wax receptacle which may be secured in raised position, as indicated in the drawings, or lowered by releasing a clamp nut 192 to expose the parts inside the receptacle for threading or cleaning purposes. The heating element for the wax pot consists of a hollow plate 194 shown in Figs. 2 and 12, having electrical controls contained in a housing 196 secured by means of screws 198 to the bracket 186. The lower end of the heating element projects into the wax contained within the receptacle 190. The threads from the three supply devices are led downwardly into the wax receptacle through the parallel slotted tubes 163 and through parallel slots 200 forming heat radiating fins at opposite sides of a block 202 secured to the heating element 194.

At the lower end of the block, the threads pass beneath thread guide pulleys having split retaining cages 204 similar to the pulleys 165 and cages 167 on the cutter retaining lever 118. The stud on which the pulleys and cages are mounted is indicated at 206 secured in suitable lugs on the block 202. To guide the threads in the slots of the block 202, there is a transverse passage through the fins formed by the slots at one side of the block and a number of contacting balls 208 are inserted in the passage to prevent movement of the thread into or out of the passage except when the balls are separated. To keep the balls together, a leaf spring 210 is screwed to the block 202 to press on the outermost ball, thus transferring its force to all of the balls in the passage.

Referring to Fig. 12, one side of the wax receptacle 190 has a bulging portion extending beyond the supporting bracket 186 to form an unmelted wax receiver in which a supply of fresh wax may be introduced from time to time. To accelerate melting the wax introduced into the receiver portion of the wax receptacle, a heat conducting inclined plate 211 is secured with its lower end in the block 202 and with its upper end extending along the lower bulging wall within the receiver portion of the receptacle. The block 202 is provided with diverging flanges 212 for conducting melted wax towards the thread guides 204 so that melted wax is quickly rendered available after replenishing the supply.

To remove the excess of wax from the thread as it leaves the wax pot, each of the three threads passes through a stripper of improved construction mounted on an upstanding ear portion of the heating element 194. The ear of the heating element projects through the thread opening in the wax receptacle bracket 186 and is spaced at all sides from the cover so as to be out of heat conducting contact with the bracket. On a flat surface formed on the ear of the heating element is secured a plate 213 having a carrier 214 pivoted thereto by a vertical bolt 216 about which the carrier is shiftable to bring any one of the three threads passing through the stripper into alignment radially of the winding spindle and bobbin mandrel with the winding position of the thread controller plate 50 directly above the wax pot. By mounting the stripper on the plate 213 heated directly by the heating element, the tendency for the wax and thread fibers to accumulate on the stripper is greatly reduced. To hold the carrier 214 in a position with any one of the threads passing through the strippers in alignment with the bobbin winding position of the thread controller plate 50 and between the cutter 104 and anvil 126, one arm of the carrier has a vertical spring-pressed plunger 218 engaging at its lower end, with any one of three holes 220 in the plate 213. At the upper end of the plunger is a suitable handle for lifting the plunger out of one hole and bringing it selectively into another. To limit the movement of the stripper carrier 214 on the plate 213, a pin 222 is mounted in the plate 213 to engage a surface on the carrier at either end of its movement about the bolt 216.

There are two forms of wax stripper disclosed herein, the form illustrated in Figs. 11 to 14, inclusive, being best adapted for general use and the form illustrated in Figs. 15 to 18, inclusive, being advantageous where more than three different sizes or colors of thread are used, and where as a result, the machine must frequently be rethreaded. The strippers of Figs. 11 to 14, inclusive, are similar in many respects to the stripper disclosed in U. S. Letters Patent to Ashworth No. 1,996,137 of April 2, 1935. As in that patent, each stripper, according to the present construction, consists of a block 224 sliding in a groove in the upper surface of the carrier 214 and a block 226 overlapping the sliding block and pivoted on a common hinge pin 228 secured in upstanding lugs on the carrier. The thread engaging ends of the blocks are cut with V-shaped notches, the openings of which face in opposite directions to provide a close fitting passage for the thread. The carrier has suitable perforations 229 through which the threads enter the passages in the strippers. The sliding blocks 224 may be adjusted relatively to the pivoted block 226 in order to increase or decrease the size of the thread passages by regulating screws 230, threaded in the carrier and each provided with a groove to receive a slotted flange on each block 224. In the patent, the pivoted block is pressed against the sliding block by means of a spring similar to the spring 231 coiled about an adjusting screw, as indicated at 232, between the hinged block and a head on the screw, the arrangement being such that when knots or other enlargements reach the stripper causing excessive resistance to movement of the thread, the pivoted block will yield and allow the thread to pass without breakage or injury. In the stripper of the patent, the V-shaped notches in the blocks which form the thread passage enter from the extreme ends of the blocks, the main body portions of the blocks being located at opposite sides of the thread passage thus formed. The pivoted blocks of the present strippers are located each with its main body portion overlapping a substantial proportion of each sliding block and each sliding block, instead of having the V-notch entering from the extreme end, is hook-shaped and the V-notch opens from inside the hook. To prevent accumulation of wax inside the hook of each sliding block, an L-shaped guard piece 234 is fitted within the hook of each sliding block and is held in place by the side of each guideway in the carrier 214. Each thread drawn through a passage formed by the blocks extends through a perforation 229 directly beneath the passage in the V-notches of the blocks so that excess wax scraped from the thread by the stripper is forced through the perforation 229 and returns to the wax pot without any tendency of accumulating on the stripper.

To hold the notches of the blocks of the present stripper in accurate alignment, each sliding block 224 has a tongue plate 238 bolted thereto and each pivoted block has, in its hub surrounding the pin 228, a groove fitting the tongue plate 238. The tongue and groove connection thus formed prevents lateral displacement of the pivoted block along the hinge pin 228, while at the same time sliding or pivotal movement of the respective blocks is not impeded.

In the quick threading form of wax strippers disclosed in Figs. 15 to 18, inclusive, a carrier 240 of the same general shape as the carrier 214 is provided mounted to swing about a stud 241 on a plate 242 corresponding to the plate 213. A spring-pressed plunger 243 in the carrier enters any one of three holes 244 and serves to maintain the carrier in any of three positions corresponding to the positions which each of the threads occupy when brought into alignment with the winding position of the thread controller. To limit the swinging movement of carrier 240, a pin 245 secured in the carrier engages edge surfaces of the plate 242. In the form of strippers illustrated in these figures, however, the carrier 240 is formed with three open-ended threading slots 246 and three sockets arranged in step-like relation, one at a higher level than the other, for receiving three V-notched stripper disks 248 secured in their sockets by screws 250. Overlapping each stripper disk 248 is a V-notched sliding block 252 having inclined sides fitting within correspondingly shaped guideways of the carrier 240. To locate the sliding blocks with the notches in alignment with the notches in the disks 248, each sliding block has a threaded lug portion through which a thumb adjusting screw 254 passes. Each thumb screw also passes through an upwardly projecting lug on the carrier and between the lug on the carrier and the lug on the block, each screw is surrounded by a compression spring 256 tending to force the sliding block in a direction to close the thread passage through the notches of the block and disk. In threading this type of stripper, the head of the thumb screw 254 is retracted against the pressure of the spring to uncover the open-ended threading slot 246, thus permitting passage of thread laterally into the notch of the corresponding disk 248. When the sliding block is released, it again closes the threading slot and retains any thread which is located in the notch of the disk in stripping position. The size of the thread passage may readily be changed by rotating the thumb screw 254 and in case of knots or other enlargements in the thread, the sliding block may be moved against the pressure of the spring 256 in any particular stripper to prevent thread breakage.

Certain features of the invention herein disclosed form the subject-matter of a divisional application Serial No. 470,586, filed December 30, 1942, relating to thread handling apparatus, including waxing devices and an arrangement of thread cutters employed in the present machine.

The nature and scope of the invention having been indicated and a particular embodiment of the invention having been described, what is claimed is:

1. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, and means acting before each bobbin is completely filled with thread to lift the thread controller clear of the flanges on that bobbin.

2. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, and means acting before each bobbin is completely filled with thread to lift the thread controller clear of the flanges on that bobbin and to bring the thread controller between the flanges of another bobbin preparatory to a new winding operation.

3. A bobbin winding machine having, in combination, a rotatable spindle for supporting a plurality of flanged bobbins, a movably mounted thread controller acting between the flanges on one bobbin at a time to cause the winding operation on each bobbin to be terminated and the winding operation on another bobbin to be started, and a yieldingly actuated ratchet bar released by the thread controller to lift the thread controller clear of the flanges on a bobbin before the bobbin is completely filled with thread and to cause the thread controller to be brought between the flanges of another bobbin preparatory to a new winding operation.

4. A bobbin winding machine having, in combination, a rotatable spindle for supporting a plurality of flanged bobbins, a movably mounted thread controller acting between the flanges on one bobbin at a time, and mechanism actuated by the thread controller for moving the spindle relatively to the controller the distance between successive bobbins after a bobbin is filled with thread including a ratchet bar having cam surfaces for lifting the controller clear of the flanges on the bobbins before relative movement between the spindle and controller is completed.

5. A bobbin winding machine having, in combination, a rotatable spindle for supporting a plurality of flanged bobbins, a movably mounted thread controller acting between the flanges on one bobbin at a time, and mechanism for moving the spindle relatively to the thread controller the distance between successive bobbins including a ratchet bar having cam surfaces and spaced notches, and escapement means connected to the thread controller and arranged for actuation by the cam surfaces after releasing the ratchet bar to lift the thread controller clear of the flanges on the bobbins before relative movement of the spindle and controller is completed.

6. A bobbin winding machine having, in combination, a rotatable spindle for supporting a plurality of flanged bobbins, a movably mounted thread controller acting between the flanges on one bobbin at a time, and mechanism for moving the spindle relatively to the thread controller including a yieldingly actuated member, a ratchet bar having cam surfaces and notches moving with the spindle, an escapement arm connected to the thread controller and a pawl on the escapement arm arranged to enter a notch in the ratchet bar while each bobbin is being wound, to be moved out of a notch when a bobbin is filled to a predetermined depth with thread and to cause the thread controller to be lifted clear of the bobbin flanges when a cam surface on the bar engages the pawl.

7. A bobbin winding machine having, in combination, a rotatable spindle for suporting a plurality of empty flanged bobbins, a movably mounted thread controller acting between the flanges on one bobbin at a time, mechanism for moving the spindle relatively to the thread controller including a ratchet bar moving with the spindle, a yielding member, a ratchet bar escapement arm connected to the thread controller, a pawl on the escapement arm arranged to release the ratchet bar when the bobbin is filled to a predetermined depth with thread and to cause the thread controller to be lifted clear of the bobbin flanges when the ratchet bar is moved, and connections between the yielding member, the ratchet bar and the spindle for advancing the ratchet bar ahead of the spindle to cause the controller to be lifted clear of the bobbin flanges before substantial movement is imparted to the spindle.

8. A bobbin winding machine having, in combination, a rotatable spindle for supporting a plurality of empty flanged bobbins, a movably mounted thread controller acting between the flanges on one bobbin at a time, mechanism for moving the spindle relatively to the thread controller including a ratchet bar moving with the spindle, a yielding member, a ratchet bar escapement arm connected to the thread controller, a pawl on the escapement arm arranged to release the ratchet bar when the bobbin is filled to a predetermined depth with thread and to cause the thread controller to be lifted clear of the bobbin flanges when the ratchet bar is moved, and a link having its mid-point acted upon by the yielding member and its ends connected to the ratchet bar and spindle, respectively, for advancing the ratchet bar ahead of the spindle to cause the controller to be lifted clear of the bobbin flanges before substantial movement is imparted to the spindle by the yielding member.

9. A bobbin winding machine having, in combination, a rotatable spindle for supporting a plurality of empty flanged bobbins, a movably mounted thread controller acting between the flanges on one bobbin at a time, mechanism for moving the spindle relatively to the thread controller including a ratchet bar moving with the spindle, a yielding member, a ratchet bar escapement arm connected to the thread controller, a pawl on the escapement arm arranged to release the ratchet bar when the bobbin is filled to a predetermined depth with thread and to cause the thread controller to be lifted clear of the bobbin flanges when the ratchet bar is moved, a link acted upon by the yielding member and connected to both the ratchet bar and spindle for advancing the ratchet bar ahead of the spindle to cause the controller to be lifted clear of the bobbin flanges before substantial movement is imparted to the spindle by the yielding member, and an adjustable stop on the link for regulating the relative positions of the spindle and thread controller when the ratchet bar is advanced ahead of the spindle.

10. A bobbin winding machine having, in combination, a rotatable spindle for supporting a plurality of empty flanged bobbins, a thread controller acting between the flanges on one bobbin at a time, mechanism for moving the spindle relatively to the thread controller including a ratchet bar moving with the spindle, a yielding member, a ratchet bar escapement arm connected to the thread controller, a pawl on the escapement arm arranged to hold the ratchet bar while a bobbin is being wound and to release the ratchet bar with the spindle when the bobbin being wound is filled to a predetermined depth with thread, and a detent on the escapement arm acting on the ratchet bar to cause the spindle, after being moved by the yielding member, to stop at a position relatively to the thread controller where the controller may enter between the flanges of a bobbin.

11. A bobbin winding machine having, in combination, a rotatable spindle for supporting a plurality of empty flanged bobbins, a thread controller acting between the flanges on one bobbin at a time, mechanism for moving the spindle relatively to the thread controller including a ratchet bar moving with the spindle, a yielding member, a ratchet bar escapement arm connected to the thread controller, a pawl on the escapement arm arranged to hold the ratchet bar while a bobbin is being wound and to release the ratchet bar with the spindle when the bobbin being wound is filled to a predetermined depth with thread, a detent on the escapement arm acting on the ratchet bar to cause the spindle, after being moved by the yielding member, to stop at a position relatively to the thread controller where the controller may enter between the flanges of a bobbin, and means for withdrawing the detent from the ratchet bar when the controller enters between the flanges of a bobbin.

12. A bobbin winding machine having, in combination, a rotatable spindle for supporting a plurality of flanged bobbins, a thread controller acting between the flanges on one bobbin at a time, and mechanism for moving the spindle relatively to the thread controller including a ratchet bar having holding and stop notches, a yielding member for moving the spindle and ratchet bar simultaneously, a ratchet bar escapement arm connected to the thread controller to regulate the movements of the spindle, a pawl on the escapement arm engaging the holding notches in the ratchet bar and acting to release the ratchet bar when a bobbin is filled to a predetermined depth with thread, a detent on the escapement arm engaging the stop notches on the ratchet bar to cause the ratchet bar to be stopped after being released by the pawl, the pawl and detent being so arranged with relation to the notches on the ratchet bar that when the detent is disengaged from the ratchet bar, the ratchet bar may be moved before being stopped by the pawl to prevent the detent from entering the same stop notch a second time after the pawl leaves a holding notch.

13. A bobbin winding machine having, in combination, a rotatable spindle for supporting a plurality of flanged bobbins, a thread controller acting between the flanges on one bobbin at a time, and mechanism for moving the spindle relatively to the thread controller including a ratchet bar having a number of rows of differently spaced notches, a yielding member for moving the spindle and ratchet bar simultaneously, a ratchet bar escapement arm connected to the thread controller, a pawl on the escapement arm cooperating with one row of notches on the ratchet bar to regulate the movements of the spindle when winding bobbins of one size, and adjustable means for changing the relative positions of the ratchet bar and pawl to cause a different row of notches to cooperate with the pawl when winding bobbins of different size.

14. A bobbin winding machine having, in combination, a rotatable spindle for supporting a plurality of flanged bobbins, a thread controller acting between the flanges on one bobbin at a time, and mechanism for moving the spindle relatively to the thread controller including a ratchet bar having notches arranged in two pairs of rows, a yielding member for moving the spindle and ratchet bar simultaneously, a ratchet bar escapement arm connected to the thread controller, pawl and detent means on the escapement arm cooperating with one pair of notch rows to regulate the movements of the spindle when winding bobbins of one side, and adjustable means for changing the position of the ratchet bar relatively to the pawl and detent means to cause a different pair of notch rows to cooperate with the pawl and detent means when winding bobbins of a different size.

15. A bobbin winding machine having, in combination, a rotatable spindle for supporting a plurality of flanged bobbins, a thread controller acting between the flanges on one bobbin at a time, and mechanism for moving the spindle relatively to the thread controller including a ratchet bar having a number of rows of differently spaced notches, a yielding member for moving the spindle and ratchet bar simultaneously, a ratchet bar escapement arm connected to the thread controller, a pawl on the escapement arm cooperating with one row of contacts on the ratchet bar to regulate the movements of the spindle when winding bobbins of one size, and means for mounting the ratchet bar rotatably to cause any desired row of notches to cooperate with the pawl when winding bobbins of different sizes.

16. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, and means for severing the thread leading from one bobbin on which a winding operation is terminated as the winding operation on the next succeeding bobbin is started.

17. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, means acting before each bobbin is completely filled with thread to lift the thread controller clear of the flanges on that bobbin, and a knife secured to the thread controller for severing the thread leading from one bobbin on which the winding operation is terminated as the controller enters between the flanges of another bobbin.

18. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, means for moving the spindle lengthwise relatively to the thread controller from one winding position to another, a frame in which the spindle is rotatably mounted, and a bearing for the flanges on the bobbins arranged to support the bobbins close to the thread controller.

19. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, means for moving the spindle lengthwise relatively to the thread controller from one winding position to another, a frame in which the spindle is rotatably mounted, a tubular bearing close to the thread controller through which bobbins on the spindle move with the spindle, and quickly adjustable means for changing the size of the bearing to accommodate bobbins of different sizes.

20. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, a mandrel for securing the bobbins to the spindle in winding positions, and means for attaching the mandrel to the spindle in any one of a number of positions corresponding to the number of bobbins being wound.

21. A bobbin winding machine having, in combination, a hollow rotatable spindle for supporting a plurality of flanged bobbins, a thread controller acting between the flanges on one bobbin at a time to cause the winding operation on each bobbin to be terminated and the winding operation on another bobbin to be started, an incomplete thread element inside the spindle, and a flat sided screw-threaded mandrel fitting the inside of the spindle arranged to slide past the incomplete thread element and having means to lock the mandrel to the spindle when given a partial rotation.

22. A bobbin winding machine having, in combination, a rotatable spindle for supporting a plurality of flanged bobbins, a thread controller acting between the flanges on one bobbin at a time to cause the winding operation on each bobbin to be terminated and the winding operation on another bobbin to be started, a mandrel for securing the bobbins to the spindle in winding positions, and a circular handle on the mandrel having for a gripping surface about its circumference a coiled spring, the coils of which are spaced sufficiently close together to provide means for retaining the end of a thread.

23. A wax thread bobbin winding machine having, in combination, a rotatable mandrel for supporting a flanged bobbin and a thread controller having a thread engaging surface acting tangentially on the outer layer of thread between the flanges of the bobbin and terminating in the direction of mandrel rotation at a location where the thread carried by the bobbin wipes said surface to prevent accumulation of wax thereon.

24. A wax thread winding machine having, in combination, a mandrel for supporting during formation a wound thread package, a cutter for severing the thread when excessive tension occurs, a thread supply comprising a supporting tube on which a wound supply cop of thread is carried and to which the final end of thread is secured, a pin for holding the tube in a position to deliver thread from one end of the tube towards the mandrel, and a member for holding the tube frictionally on the pin with sufficient resistance to cause the cutter to sever the thread before the tube, stripped of thread, is drawn by the pull of the thread clear of the pin.

25. A wax thread winding machine having, in combination, a mandrel for supporting during formation a wound thread package, a cutter for severing the thread when excessive tension occurs, a thread supply comprising a supporting tube on which a wound supply cop of thread is carried and to which the final end of thread is secured, a pin for holding the tube in a position to deliver thread from one end of the tube towards the mandrel, a supporting tube on which is wound a self-sustaining cylindrical cop of thread and to which the free end of thread is secured, a free-ended pin for holding the supporting tube in a position to deliver thread from one end of the cop towards the mandrel, a friction member for holding the tube on the pin when the end is reached to cause actuation of the cutter before the tube is drawn clear of the pin by the pull of the thread, and a dished washer yieldingly pressed against the opposite end of the cop from which thread is delivered to prevent the thread from being looped behind the cop while being unwound.

26. A wax thread winding machine having, in combination, a mandrel for supporting a series of wound thread packages, step-by-step mechanism including a ratchet bar for moving the mandrel to cause successive thread packages to be wound, a cutter for severing the thread when excessive tension occurs, and means controlled by the ratchet bar for causing the cutter to sever the thread after all the thread packages on the mandrel are filled with thread under normal tension.

27. A wax thread winding machine having, in combination, a mandrel for supporting a series of wound thread packages, step-by-step mechanism including a ratchet bar for moving the mandrel to cause successive thread packages to be wound, a cutter for severing the thread when excessive tension occurs, means controlled by the ratchet bar for causing the cutter to sever the thread after all the thread packages on the mandrel are filled with thread under normal tension, and a knife for severing the thread between thread packages as each successive package is being wound.

28. A winding machine having, in combination, a rotatable mandrel for supporting a series of thread packages, a thread controller arranged to be actuated by the thread in a thread package when the package is being filled with thread, mechanism for moving the mandrel relatively to the thread controller including a ratchet bar and a ratchet bar escapement arm connected to the thread controller, a retaining lever mounted on the thread controller, a spring operated thread cutter controlled by the retaining lever to sever the thread when excessive tension occurs in the thread, and means on the ratchet bar for actuating the retaining lever to cause the thread to be severed by the cutter after all the packages on the mandrel are filled with thread.

29. A winding machine having, in combination, a rotatable mandrel for supporting a series of thread packages, a thread controller arranged to be actuated by the thread in a thread package when the package is being filled with thread, mechanism for moving the mandrel relatively to the thread controller including a ratchet bar and a ratchet bar escapement arm connected to the thread controller, a retaining lever mounted on the thread controller, a spring operated thread cutter controlled by the retaining lever to sever the thread when excessive tension occurs in the thread, a pin on the ratchet bar, and a cam block on the retaining lever arranged to engage the pin on the ratchet bar when the thread controller is actuated as the last thread package on the spindle is being filled with thread and to cause the retaining lever to be moved in a direction to release the cutter.

30. A winding machine having, in combination, a rotating mandrel for supporting a series of wound thread packages, a movably mounted thread controller arranged to be actuated by the thread in a package when the package is being filled with thread, a spring operated thread cutter controlled by tension in the thread leading to the thread package being wound, means for lifting the thread controller away from the thread in the package when the cutter severs the thread, and a manually actuated lever for resetting the cutter after severing the thread and for causing the thread controller to be moved towards the mandrel into thread engaging position.

31. A winding machine having, in combination, a rotating mandrel for supporting a series of wound thread packages, a thread controller arranged to be actuated by the thread in a package when the package is being filled with thread, a spring operated thread cutter, a retaining lever connecting the cutter and thread controller to cause the controller to be pressed yieldingly against the thread in the package, and means for releasing the cutter from the retaining lever to relieve the yielding pressure of the controller on the thread.

32. A winding machine having, in combination, a rotating mandrel for supporting a series of wound thread packages, a thread controller arranged to be actuated by the thread in a package when the package is being filled with thread, a spring operated thread cutter, a retaining lever connecting the cutter and thread controller to cause the controller to be pressed yieldingly against the thread in the package, means for releasing the cutter from the retaining lever to relieve the yielding pressure of the controller on the thread, and cam means actuated by the cutter for lifting the controller from the thread when the pressure of the controller on the thread is relieved.

33. A winding machine having, in combination, a rotating mandrel for supporting a series of wound thread packages, a spring operated thread cutter controlled by tension in the thread leading to the thread package being wound, a motor for driving the mandrel, a starting and stopping switch for the motor, and connections between the switch and the thread cutter for causing the motor to be stopped when the cutter severs the thread.

34. A winding machine having, in combination, a rotatable mandrel for supporting a plurality of wound thread packages, a movably mounted thread controller, mechanism for moving the mandrel relatively to the thread controller including a ratchet bar having holding and stop notches, a yielding member for moving the spindle and ratchet bar simultaneously, a ratchet bar escapement arm connected to the thread controller to regulate movements of the spindle, a pawl on the escapement arm engaging the holding notches in the ratchet bar and acting to release the ratchet bar when a package is filled with thread, a detent on the escapement arm engaging a stop notch on the ratchet bar to cause the ratchet bar to be stopped after being released by the pawl, a retaining lever having a thread guide, a spring actuated cutter controlled by the retaining lever to sever the thread when excessive tension occurs, means for lifting the thread controller away from a thread package when the cutter severs the thread, and a manually actuated lever for resetting the cutter after severing the thread and for moving the detent against the ratchet bar to secure the spindle in any lengthwise position to which it is moved preparatory to a new winding operation.

PAUL W. SENFLEBEN.